United States Patent
Zabawskyj et al.

(10) Patent No.: US 8,270,942 B2
(45) Date of Patent: Sep. 18, 2012

(54) METHOD FOR THE INTERCEPTION OF GTP-C MESSAGES

(75) Inventors: Bohdan Zabawskyj, Woodbridge (CA); Rubens Rahim, Markham (CA); Karthik Ramakrishnan, Dubai (AE)

(73) Assignee: Redknee Inc., Mississauga (CA)

( * ) Notice: Subject to any disclaimer, the term of this patent is extended or adjusted under 35 U.S.C. 154(b) by 845 days.

(21) Appl. No.: 12/066,022

(22) PCT Filed: Sep. 6, 2005

(86) PCT No.: PCT/CA2005/001346
§ 371 (c)(1),
(2), (4) Date: Aug. 4, 2008

(87) PCT Pub. No.: WO2007/028225
PCT Pub. Date: Mar. 15, 2007

(65) Prior Publication Data
US 2009/0168697 A1    Jul. 2, 2009

(51) Int. Cl.
*H04M 11/00* (2006.01)
*H04W 4/00* (2009.01)

(52) U.S. Cl. ........................ 455/405; 370/238
(58) Field of Classification Search .................. 455/405; 370/328
See application file for complete search history.

(56) References Cited

U.S. PATENT DOCUMENTS

| | | | |
|---|---|---|---|
| 5,650,994 A | 7/1997 | Daley | |
| 6,031,904 A | 2/2000 | An et al. | |
| 6,067,347 A | 5/2000 | Farris et al. | |
| 6,133,912 A | 10/2000 | Montero | |
| 6,584,312 B1 | 6/2003 | Morin et al. | |
| 6,603,969 B1 | 8/2003 | Vuoristo et al. | |
| 6,628,954 B1 | 9/2003 | McGowan et al. | |
| 6,731,932 B1 | 5/2004 | Rune et al. | |
| 6,781,972 B1 | 8/2004 | Anderlind et al. | |
| 6,804,716 B1 | 10/2004 | Koch et al. | |

(Continued)

FOREIGN PATENT DOCUMENTS

WO    03/067830 A1    8/2003

(Continued)

OTHER PUBLICATIONS

International Search Report in the corresponding International Application No. PCT/CA2005/001346 Aug. 4, 2010.

(Continued)

*Primary Examiner* — Kamran Afshar
*Assistant Examiner* — Omoniyi Obayanju
(74) *Attorney, Agent, or Firm* — Perry & Currier Inc.; Kristjan Spence

(57) ABSTRACT

Disclosed is a species of control-message intercept method which includes a passive monitoring approach whereby the relevant control packets are inspected for the purpose of providing additional information for the purpose of facilitating the operation of some primary or 'master' Internet Protocol (IP) charging/rating middleware platform/gateway system (intended to equip network operators with the ability to rate and bill IP traffic), and secondly, an invasive technique whereby control (GTP-C) messages are injected for the purpose of altering the state of a given data session in an more aggressive fashion (e.g. to drop a data session when the subscriber runs out of money in his/her prepaid account).

8 Claims, 1 Drawing Sheet

U.S. PATENT DOCUMENTS

| | | |
|---|---|---|
| 7,110,749 B2 | 9/2006 | Zellner et al. |
| 7,116,985 B2 | 10/2006 | Wilson et al. |
| 7,181,441 B2 | 2/2007 | Mandato et al. |
| 7,203,752 B2 | 4/2007 | Rice et al. |
| 7,215,754 B1 | 5/2007 | Woodson et al. |
| 7,493,125 B2 | 2/2009 | Nagesh et al. |
| 2002/0115453 A1 | 8/2002 | Poulin et al. |
| 2003/0063730 A1 | 4/2003 | Woodring |
| 2003/0081607 A1 | 5/2003 | Kavanagh |
| 2003/0115203 A1 | 6/2003 | Brown et al. |
| 2004/0068502 A1 | 4/2004 | Vogedes et al. |
| 2004/0105424 A1 | 6/2004 | Skoczkowski et al. |
| 2004/0148384 A1 | 7/2004 | Ramakrishnan et al. |
| 2005/0030920 A1* | 2/2005 | Garcia Cadarso et al. ... 370/328 |
| 2008/0119203 A1 | 5/2008 | Shalmon et al. |

FOREIGN PATENT DOCUMENTS

| | | | |
|---|---|---|---|
| WO | 03067830 A1 | 8/2003 | |

OTHER PUBLICATIONS

Related European Patent Application No. 07800591.5 Search Report dated Oct. 7, 2010.

Nokia: "Deletion of PDP contexts with exhausted account", 3GPP Draft; S5-024331, 3rd Generation Partnership Project (3GPP), Mobile Competence Centre; 650, Route Des Lucioles; F-06921 Sophia-Antipolis Cedex; France, vol. SA WG5, No. Atlanta/Georgia, USA; 20021009, Oct. 9, 2002, XP050295346.

"Digital cellular telecommunications system (Phase 2+); Universal Mobile Telecommunications System (UMTS); General Packet Radio Service (GPRS); GPRS Tunnelling Protocol (GTP) across the Gn and Gp interface (3GPP TS 29.060 version 5.2.0 Release 5); ETSI TS 129 060" ETSI Standards, LIS, Sophia Antipolis, Cedex, France, vol. 3-CN2; 3-CN4, No. V5.2.0, Jun. 1, 2002, XP014017195.

European Patent Application No. EP 05 78 4366 Supplementary Search Report dated Mar. 26, 2010.

* cited by examiner

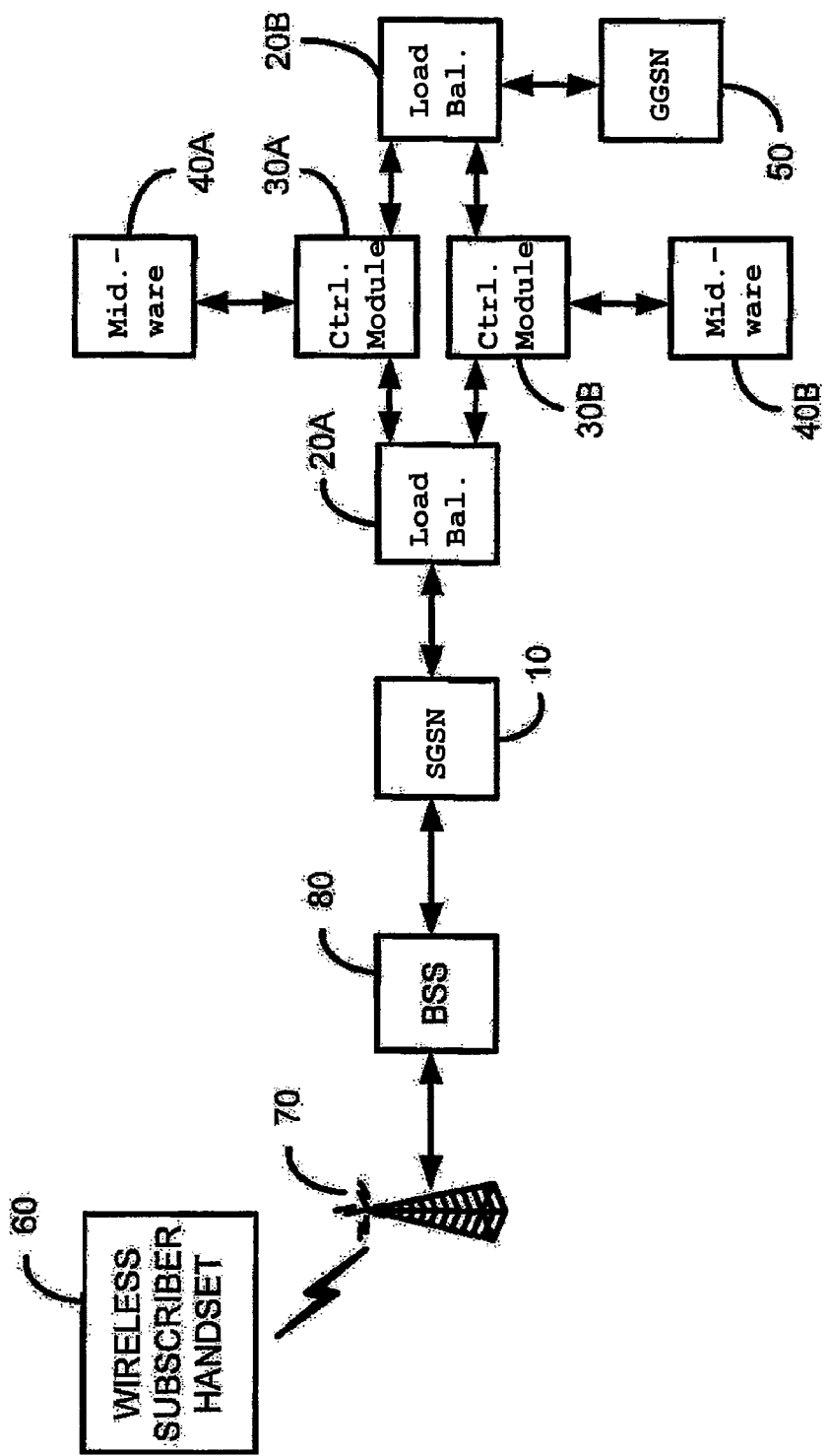

METHOD FOR THE INTERCEPTION OF GTP-C MESSAGES

BACKGROUND

Related teachings in the state of the art as U.S. Patent Application 20030081607 by Kavanagh, entitled general packet radio service tunneling protocol (GTP) packet filter, discloses a method of filtering data packets in General Packet Radio Service (GPRS) Tunneling Protocol (GTP) signaling messages, whereby selected messages from GTP Path Management, GTP Tunnel Management, GTP Mobility Management, and GTP Location Management messages are analyzed against a plurality of filtering criteria, and data packets that do not meet such filtering criteria are dropped while data packets that meet the criteria are passed. However, the application by Kavanagh speaks to a module for selective filtering of GTP Data packets, whereas our invention of present seeking the protection of Letters Patent, is largely directed at proxying and filtering GTP Control packet(s), which are on a separate User Datagram Protocol (UDP) port number and perform a different set of business operations.

WIPO Patent Application (WO) 03067830 by Camunas et al., entitled a system to obtain value-added services in real-time, based on the General Packet Radio Service (GPRS)-network, discloses a system to obtain value-added services in real-time based on the General Packet Radio Service (GPRS) network, which comprises Serving GPRS Support Node (SGSN) and Gateway GPRS Support Node (GGSN) nodes to enable the access from a mobile station to different data networks, using the radio access of a Global System for Mobile Communications (GSM) or Universal Mobile Telecommunications Service (UMTS) network; wherein between the SGSN and GGSN nodes the invention comprises means to handle GTP protocol data packets, and wherein the GTP messages traffic, which would have otherwise flowed directly between the SGSN and the GGSN nodes, is diverted through said means. When said means detect a GTP message from an SGSN asking a GGSN for the establishment of a GTP tunnel for a Packet Data Protocol (PDP) context, said means establish instead two GTP tunnels: one between the Camunas et al.'s invention and the SGSN and the other between Camunas et al.'s invention and the GGSN (once established, the user data packets will arrive through one of the two tunnels associated to their PDP Context and will be transferred to the other tunnel). However, Camunas et al.'s invention requires all GTP packets to be intercepted, whereas the invention disclosed herewith only requires and speaks to the intermediation of GTP-C (GPRS Tunneling Protocol-Control plane) (the control) packets which remains a more resourceful approach to advancing the practice of the art. Furthermore, our invention may monitor the GTP-U (GPRS Tunneling Protocol-User plane) packets or alternatively rely on the packet intermediations of the method for implementing an Internet Protocol (IP) charging and rating middleware platform and gateway system as detailed in patent application Ser. No. 10/348,972, for the purpose of providing the data intermediation and intercept functionality on the data plane. (Technicians skilled in the art will recognize that the invention of present need not be limited to the aforementioned method for implementing an Internet Protocol (IP) charging and rating middleware platform and gateway system and other similar network implementations may be employed without diluting the intent and scope as such).

REFERENCES CITED

U.S. Patent Application 20030081607 dated May, 2003, to Kavanagh, A. in class 370/392.

Foreign Patent Document WO 03067830 dated August, 2003.

TECHNICAL FIELD

The present invention relates generally to wireless telecommunications and gateway/intercept services; and more specifically, to a method for the interception of GTP messages.

SUMMARY

Disclosed is a species of control-message intercept method which includes a passive monitoring approach whereby the relevant control packets are inspected for the purpose of providing additional information for the further additional purpose of facilitating the operation of some primary or 'master' Internet Protocol (IP) charging/rating middleware platform/ gateway system (intended to equip network operators with the ability to rate and bill IP traffic), and secondly, an invasive technique whereby control (GTP-C) messages are injected for the purpose of altering the state of a given data session in an more aggressive fashion (e.g. to drop a data session when the subscriber runs out of money in his/her prepaid account).

An aspect of the specification provides a method for the interception of general packet radio service tunneling protocol control (GTP-C) messages.

The method can be part of a computer program product (GTP-C Control Module), comprising:

a) a computer readable memory medium; and b) a computer program.

The computer program product can intermediates said telecommunications traffic between the Gateway GPRS Serving/ Support Node (GGSN) and the Serving GPRS Support Node (SGSN).

The computer program product can be articulated to intercept GTP-C messages with given fields, states, addresses, contexts and so forth.

The computer program product can be articulated to ignore and/or simply not process GTP-C messages (generally) or those with given fields, states, addresses, contexts and so forth.

The computer program product can interface with additional network components to provide further functionality as packet/date rating and classification, balance query and so forth.

Another aspect of the specification provides a control-message intercept method which exists, and is implemented as part of a computer program product, whereby control packets are passively monitored for the purpose of providing additional information for the further additional purpose of facilitating the operation of some primary or master Internet Protocol (IP) charging/rating middleware platform/gateway system (intended to equip network operators with the ability to rate, charge, and intermediate IP traffic), and secondly, an invasive technique whereby control (GTP-C) messages are modified, injected, or deleted for the purpose of altering the state of a given data session in an more aggressive fashion (including, where for instance, a data session need be dropped when the subscriber runs out of money in his/her prepaid account).

BRIEF DESCRIPTION OF THE DRAWINGS

FIG. 1 illustrates a typical, non-limiting embodiment of the system level architecture employed in the disclosure of present.

DETAILED DESCRIPTION OF THE PREFERRED EMBODIMENTS

Members skilled in the art will recognize that the ensuing represents an illustrative recital of the preferred embodiments of the invention of present and other embodiments may be articulated, gleaned and articulated from such while still remaining within its spirit and scope. Indeed equivalents found within the state of the art, and those which may reasonably and effectively be deemed equivalent in the future should also be understood as being incorporated by reference hereto and such. Furthermore, much of the language has been illustrative and is to be construed as expressly for pedagogical purposes in helping elucidate the art as concisely and beneficially as practical.

The method for the interception of GTP messages disclosed herewith is implemented as part of a computer program product, hereinafter, the GTP-C Control Module.

FIG. 1 represents the preferred illustrative embodiment of the invention's architecture and, as such, depicts a fault redundant GTP-C Control Module pair 30A, 30B surrounded by Load Balancers 20A, 20B (one Load Balancer 20A on the side of the SGSN 10, the other Load Balancer 20B on the side of the GGSN 50). FIG. 1 also depicts a wireless subscriber handset 60 that connects to SGSN 10 via a wireless antenna 70 and a base station sub-system (BSS) 80. The architecture in FIG. 1 is configured to carry telecommunication traffic GTP messages between wireless subscriber handset 60 and GGSN 50 via SSGN 10.

In alternative embodiments, only a partial GTP-C stack need be articulated and developed when only handling a fraction of the totality of the messages. (These operations are CreateContextRequest/Response, UpdateContextRequest/Response and DeleteContextRequest/Response, although practitioners may well realize that other iterations and operations may be articulated). In this alternative embodiment, for the remainder of the messages, we need only be able to identify them as GTP-C messages and forward them on. (Indeed, this art is not intended to represent a proxy design. The GTP-C connection is generally not terminated at the GTP-C Control Module 30A 30B).

The method for the interception of GTP messages, in the preferred embodiment (though of course not necessarily), may also be co-articulated and implemented with the method for implementing an Internet Protocol (IP) charging and rating middleware platform and gateway system as detailed in patent application Ser. No. 10/348,972, to enhance the packet/data rating and classification mechanisms inherent in the invention disclosed hereto. Technicians skilled in the art will recognize that the invention of present need not be limited to the aforementioned method for implementing an Internet Protocol (IP) charging and rating middleware platform and gateway system and other similar network implementations may be employed without diluting the intent and scope as such.

Now, in continuing with reference to FIG. 1, upon detection of a CreateContextRequest (for instance), said message will be delayed while the method for implementing an Internet Protocol (IP) charging and rating middleware platform and gateway system 40A 40B (as detailed in patent application Ser. No. 10/348,972) is contacted for balance query. (Technicians skilled in the art will recognize that the invention of present need not be limited to the aforementioned method for implementing an Internet Protocol (IP) charging and rating middleware platform and gateway system and other similar network implementations may be employed without diluting the intent and scope as such). The message is then forwarded on to the GGSN 50 for context creation and the response forwarded back to the SGSN 10 by the GTP-C Control Module 30A 30B. For deleting a context (as, when a subscriber has run out of balance), the method for implementing an Internet Protocol (IP) charging and rating middleware platform and gateway system 40A, 40B, will initiate the delete request to the GTP-C Control Module 30A, 30B. The GTP-C Control Module 30A 30B will in turn send delete requests to both the GGSN 50 and SGSN 10 using spoofed packets.

In alternative embodiments, said deletePDPContext message can also initiate by the SGSN 10 or GGSN 50 where the GTP-C Control Module 30A 30B intercepts the message, and further triggers the session deletion to IP charging and rating middleware platform and gateway system 40A 40B. The deletePDPContext may then be simply forwarded by the GTP-C Control Module 30A 30B to the GGSN 50 or SGSN 10 depending on the initiator of the deletePDPContext message.

The invention claimed is:

1. A method for the interception of General Packet Radio Service (GPRS) control (GTP-C) messages, comprising:
   intercepting a GTP-C message at a control module, said control module configured to intercept GTP-C messages with one or more specified fields, states, addresses, or contexts and to ignore GTP-C messages with one or more of other specified fields, states, addresses, or contexts; said control module residing between a Serving GPRS Support Node (SGSN) and a Gateway GPRS Support Node (GGSN);
   performing a balance query to determine if a wireless subscriber device has a sufficient balance;
   forwarding said message from said control module to said GGSN if said wireless subscriber device has a sufficient balance; and,
   causing modification of said GTP-C message if said subscriber device has insufficient balance, wherein said modification comprises sending delete requests from said control module in the form of spoofed packets to each of the SGSN and the GGSN.

2. The method of claim 1, where the modification of said GTP-C message can include the deletion of the GTP-C message or replacement of the GTP-C message with at least one GTP-C message.

3. The method of claim 1, where said balance query is performed by at least one additional network component configured to provide packet/data rating and classification in addition to said balance query.

4. The method of claim 3 wherein said additional network component is a charging and rating middleware platform and gateway system.

5. A system for the interception of General Packet Radio Service (GPRS) control (GTP-C) messages, comprising:
   a control module for intercepting a GTP-C message received from a Serving GPRS Support Node (SGSN) connected to said control module, said control module configured to intercept GTP-C messages with one or more specified fields, states, addresses, or contexts and to ignore GTP-C messages with one or more of other specified fields, states, addresses, or contexts; said control module further connected to a Gateway GPRS Support Node (GGSN); said message originating from a wireless subscriber device and carried to said control module via said SGSN;
   said control module further configured to initiate a balance query to determine if said wireless subscriber device has a sufficient balance;

said control module further configured to forward said message from said control module to said GGSN if said wireless subscriber device has a sufficient balance; and, said control module further configured to cause deletion of said GTP-C message if said subscriber device has insufficient balance, by sending delete requests in the form of spoofed packets to each of the SGSN and the GGSN.

6. The control module of claim 5 wherein said balance query is performed by at least one additional network component configured to provide packet/data rating and classification in addition to said balance query.

7. The control module of claim 6 wherein said additional network component is a charging and rating middleware platform and gateway system.

8. A non-transitory computer-readable medium storing a plurality of programming instructions; said programming instructions executable on a control module; said programming instructions for configuring said control module to perform a method for the interception of General Packet Radio Service (GPRS) control (GTP-C) messages; said method comprising:

intercepting a GTP-C message at said control module, said control module configured to intercept GTP-C messages with one or more specified fields, states, addresses, or contexts and to ignore GTP-C messages with one or more of other specified fields, states, addresses, or contexts; said control module residing between a Serving GPRS Support Node (SGSN) and a Gateway GPRS Support Node (GGSN);

performing a balance query to determine if said wireless subscriber device has a sufficient balance;

forwarding said message from said control module to said GGSN if said wireless subscriber device has a sufficient balance; and, causing deletion of said GTP-C message if said subscriber device has insufficient balance, wherein said deletion comprises sending delete requests from said control module in the form of spoofed packets to each of the SGSN and the GGSN.

* * * * *